(12) United States Patent
Rogala

(10) Patent No.: US 6,394,238 B1
(45) Date of Patent: May 28, 2002

(54) REGENERATIVE SUSPENSION FOR AN OFF-ROAD VEHICLE

(75) Inventor: Jeffey A. Rogala, Oconomowoc, WI (US)

(73) Assignee: Husco International, Inc., Waukesha, WI (US)

( * ) Notice: Subject to any disclaimer, the term of this patent is extended or adjusted under 35 U.S.C. 154(b) by 0 days.

(21) Appl. No.: 09/731,483

(22) Filed: Dec. 7, 2000

Related U.S. Application Data

(60) Provisional application No. 60/207,068, filed on May 25, 2000.

(51) Int. Cl.[7] ................................................. F16F 9/34
(52) U.S. Cl. ................. 188/266.2; 188/314; 267/64.13; 267/DIG. 1; 280/5.514; 280/5.515; 280/124.159; 280/124.161
(58) Field of Search ............................ 188/266.2, 266.4, 188/282.1, 282.2, 282.5, 282.6, 283, 316, 322.15, 322.26, 314, 313; 267/64.11, 64.13, 64.16, 64.26, 64.28, 218, 124, DIG. 1; 280/5.513, 5.514, 5.515, 6.157, 6.159, 124.159, 124.16, 124.161

(56) References Cited

U.S. PATENT DOCUMENTS

| | | | | |
|---|---|---|---|---|
| 3,561,574 A | * | 2/1971 | Dickinson, Jr. et al. ...... | 188/97 |
| 4,212,484 A | * | 7/1980 | Fujii ........................... | 208/707 |
| 4,593,931 A | * | 6/1986 | Shiratori et al. ............ | 280/714 |
| 4,655,440 A | * | 4/1987 | Eckert ...................... | 267/64.11 |
| 4,887,699 A | * | 12/1989 | Ivers et al. ................. | 188/378 |
| 5,342,023 A | * | 8/1994 | Kuriki et al. ............ | 267/64.17 |
| 6,092,816 A | * | 7/2000 | Sekine et al. ............ | 280/6.159 |
| 6,161,845 A | * | 12/2000 | Shono et al. .............. | 280/6.15 |

* cited by examiner

Primary Examiner—Paul N. Dickson
Assistant Examiner—Xuan Lan Nguyen
(74) Attorney, Agent, or Firm—George E. Haas; Quarles & Brady LLP

(57) ABSTRACT

A hydraulic circuit controls a doubling acting cylinder of a vehicle suspension to provide load leveling and shock absorption functions. A set of solenoid valves control the application of pressurized hydraulic fluid from a supply line to the cylinder and from the cylinder to a tank return line to raise and lower the vehicle for load leveling. The chambers of the cylinder are interconnected by a parallel arrangement of a check valve, orifice and a relief valve. Another parallel arrangement of a check valve, orifice and a relief valve couples the cylinder to an accumulator. These parallel arranged components enable the doubling acting cylinder to function as a passive shock absorber. A lock-out valve is provided in the preferred embodiment a to defeat the shock absorber operation and provide a very stiff suspension.

20 Claims, 3 Drawing Sheets

REGENERATIVE SUSPENSION FOR AN OFF-ROAD VEHICLE

RELATED APPLICATIONS

This application claims benefit of U.S. Provisional Patent Application No. 60/207,068 filed May 25, 2000.

FIELD OF THE INVENTION

The present invention relates to suspension systems for off-road equipment, such as agricultural tractors, and more particularly to such suspension systems that provide hydraulic load leveling.

BACKGROUND OF THE INVENTION

Off-road equipment, such as construction and agricultural vehicles, can carry widely varying loads. When a relatively heavy load is applied to the equipment, the vehicle body is forced downward with respect to the axles supporting the wheels on which the vehicle rides. This results in compression of the suspension which can adversely affect the maneuverability of the vehicle. On the other hand, if the suspension is configured for very heavy loads, the vehicle may have an undesirable ride under light load conditions.

As a result, many vehicles have automatic load leveling systems which employ one or more hydraulic cylinders between the axle and the frame of the vehicle to ensure that the frame is maintained at the proper height above the axle. When a heavy load is applied to the frame, the drop of the frame is sensed and additional hydraulic fluid is applied to the cylinder to raise the frame the desired distance from the axle. Thereafter, when the load is removed from the vehicle the frame will rise significantly above the axle. When this occurs hydraulic fluid is applied to the opposing chamber of the cylinder to lower the frame with respect to the axle. This type of automatic hydraulic load leveling system ensures that the frame and axle will be at the desired separation regardless of the size of the load applied to the vehicle.

One of the drawbacks of this load leveling system is that the opposite chambers of the double acting cylinder have separate pressure control circuits and require high pump pressure to move the cylinder in both directions. Thus the consumption of fluid from the pump for load leveling may adversely affect the availability of fluid pressure for other functions powered by the tractor. In order to compensate for that power consumption, the pump capacity would have to be increased thus raising the cost of the hydraulic system.

Although the piston within the load leveling hydraulic cylinders moves under heavy loads, the piston does not move in response to the relatively small forces due to driving the vehicle over rough terrain. Therefore, the cylinders provide a very stiff the suspension system with negligible shock absorption. This results in a very rough ride, which can be uncomfortably for the operator.

SUMMARY OF THE INVENTION

The present system provides a hydraulic load leveling system that has a passive mode that provides shock absorption.

A hydraulic circuit controls a suspension of a vehicle having a cylinder and piston for load leveling functionality. The hydraulic circuit has a first node and a second node that is connected to a piston chamber of the cylinder. A first control valve has an inlet, for connection to a supply line for pressurized hydraulic fluid in the vehicle, and has a outlet which is coupled to the first node. A control valve assembly connects the first node to a tank return line of the vehicle. In the preferred embodiment, the control valve assembly comprises a second control valve connected to operate a pilot valve. The second control valve has an inlet for connection to the pump supply line and has an outlet. The pilot operated valve has a control port connected to the outlet of the second control valve, a first port coupled to the first node, and a second port for connection to the tank return line. This group of components provides the load leveling function where the control valves are electrically operated to raise and lower the vehicle.

The shock absorption is implemented by an accumulator coupled to the first node and two valve subcircuits. The first subcircuit includes a first check valve coupling the first node to the second node and permits fluid to flow through the first check valve only in a direction from the first node to the second node. A first subcircuit orifice is connected in parallel with the first check valve, and a first relief valve preferably is connected in parallel with the first check valve and opening when pressure at the second node is a predefined amount greater than pressure at the first node. The second subcircuit includes a second check valve coupling the second node to a port of the rod chamber wherein fluid can flow through the second check valve only in a direction from the second node to the rod chamber. A second subcircuit orifice is connected in parallel with the second check valve, and preferably a second relief valve is connected in parallel with the second check valve and opening when pressure in the rod chamber is a predefined amount greater than pressure at the piston chamber.

The second subcircuit meters the flow of hydraulic fluid between the chambers of the cylinder thereby enabling the cylinder to act as a shock absorber. Because a rod is attached to one side of the piston, one of the cylinder chambers has less volume that the other. The extra fluid required for the larger chamber is sent into and out of the accumulator as needed in response to operation of the first subcircuit.

DETAILED DESCRIPTION OF THE INVENTION

Figure 1:
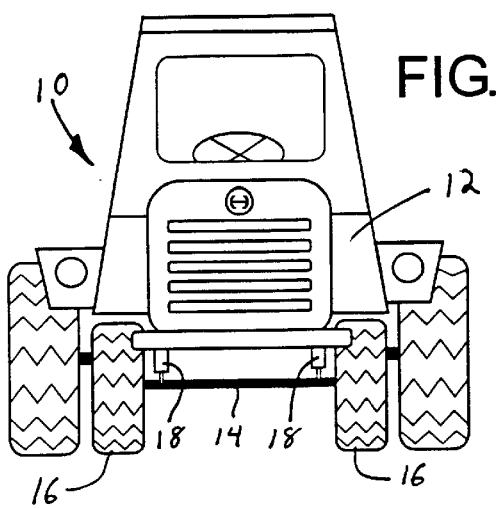
FIG. 1 is a front view of an off-road vehicle that incorporates a regenerative suspension system according to the present invention.

With initial reference to FIG. 1, an off-road vehicle 10, such as an agricultural tractor, has a body 12 with a frame that is linked to axles to which the wheels of the vehicle are attached. For example, the front axle 14 is coupled to the body 12 by a pair of hydraulic cylinders 18 and has a pair of wheels 16 attached to it. As will be described, pressurized hydraulic fluid is applied to and drained from the cylinders 18 to control the distance that the body 12 of the tractor is above the front axle 14. This hydraulic system ensures that a relatively constant separation distance exists regardless of the load applied to the tractor 10.

Figure 2:
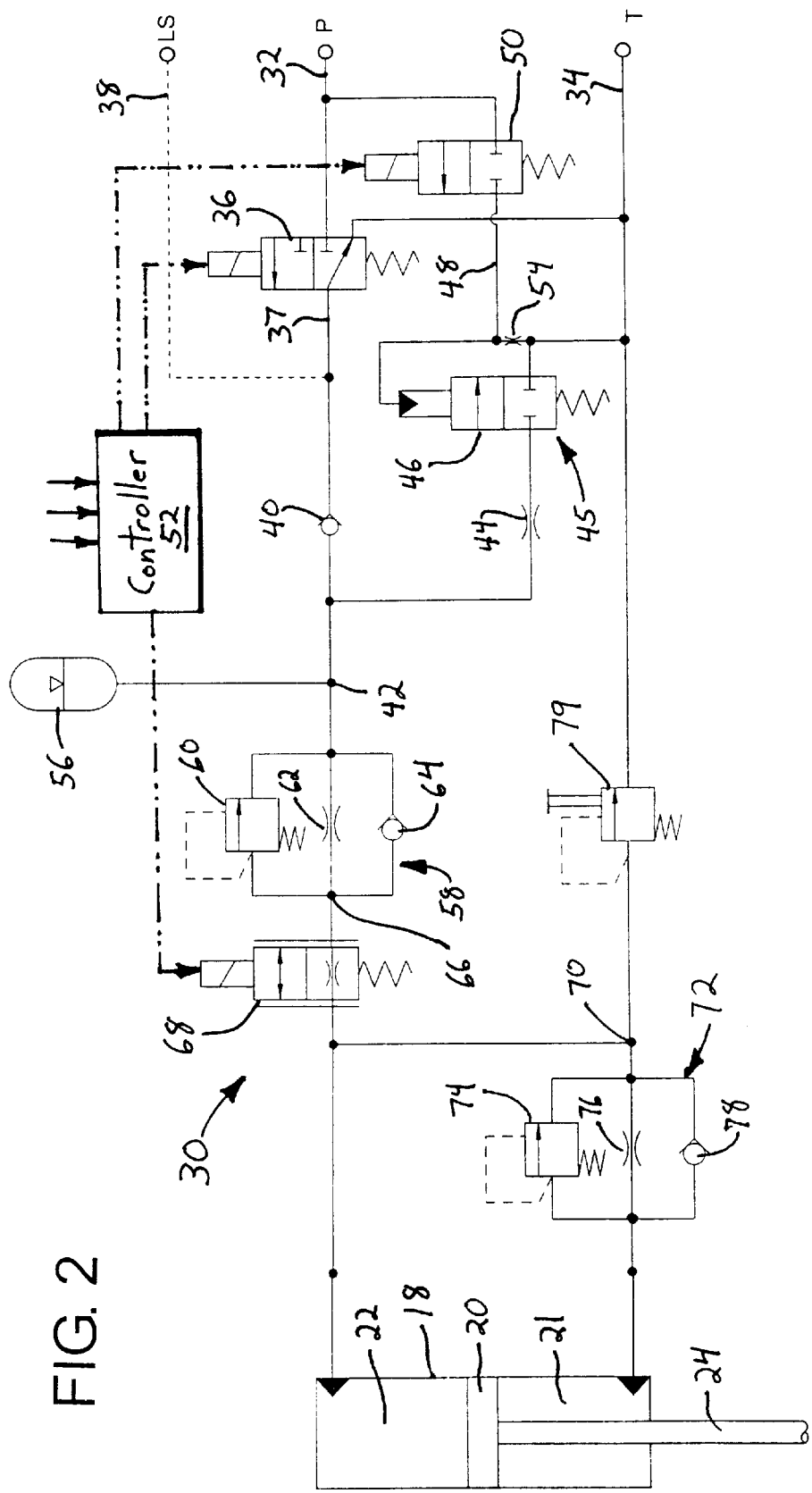
FIG. 2 is a schematic diagram of a hydraulic circuit of the regenerative suspension system.

As shown in FIG. 2, the cylinder 18 has an internal bore in which a piston 20 is slidably received thereby forming a rod chamber 21 and a piston chamber 22 within the cylinder on opposite sides of the piston. The rod and piston chambers 21 and 22 vary in volume as the piston moves within the cylinder. The cylinder 18 is attached to the frame of the tractor body 12 while the remote end of the piston rod 24 is attached to the front axle 14.

The cylinder chambers 21 and 22 are connected to a regenerative hydraulic circuit 30 that controls the flow of fluid from a pump supply line 32 and back to a tank return line 34. Specifically, the pump supply line 32 is connected to an inlet of a first control valve 36 that has a spool which is driven by a solenoid. Depending upon the position of that spool, an outlet 37 of the first control valve 36 is connected either to the pump supply line 32 or to the tank return line 34. That latter connection occurs when the solenoid is de-energized.

The outlet 37 of the first control valve 36 is connected to the load sense circuit (LS) 38 to provide a control signal to a variable displacement pump on the tractor 10 which supplies hydraulic fluid to the pump supply line 32. A supply check valve 40 couples this outlet 37 to a first node 42 in the hydraulic circuit 30 and prevents the flow of hydraulic fluid from that first node back to the first control valve 36.

The first node 42 is coupled to the tank return line 34 by a control valve assembly 45 comprising a pilot valve 46 operated by a second solenoid control valve 50. Specifically the first node 42 is connected through a drain orifice 44 to an inlet port of a zero-leakage, pilot operated valve 46. An outlet port of the pilot operated valve 46 is connected to the tank return line 34. The position of the pilot operated valve 46 is determined by pressure in a control line 48 which is coupled by a second control valve 50 to the pump supply line 32. Both the first and second control valves 36 and 50 have solenoid operators which drive their respective spools in response to an electrical signal from a controller 52, as will be described. Although the preferred embodiment of the hydraulic circuit 30 employs two valves 46 and 50 in the control valve assembly 45, a single valve could be utilized. A relief orifice 54 couples the control line 48 to the tank return line 34 and acts as a bleed path for the pressure within the control line 48 when the second control valve 50 is in the closed state.

The first node 42 is connected to an accumulator 56. A valve subcircuit 58 comprises a first relief valve 60, a first orifice 62 and a first check valve 64 connected in parallel between the first node 42 and an intermediate node 66. The first relief valve 60 opens when the pressure at the intermediate node 66 exceeds a predefined pressure level. Fluid flows through the second check valve 64 only in the direction from the first node 42 to the intermediate node 66.

The intermediate node 66 is coupled to a second node 70 by a solenoid operated, lock-out valve 68 which also is operated by the controller 52. The lock-out valve 68 has a fully open state when the solenoid is energized and a de-energized state in which an orifice connects the intermediate and second nodes 66 and 70. An alternative embodiment of the lock-out valve 68 completely closes the connected between those nodes 66 and 70 in the de-energized state.

The second node 70 is connected directly to the piston chamber 22 of the cylinder 18, and by a second valve subcircuit 72 to the rod chamber of cylinder 18. The second valve subcircuit 72 comprises a second relief valve 74, a second orifice 76 and a second check valve 78 connected in parallel between the second node 70 and the piston chamber 21. The second relief valve 74 opens when the pressure in the rod chamber 21 exceeds a predetermined level. Fluid is able to flow through the second check valve 78 only in a direction from the second node 70 to the rod chamber 21.

A safety pressure relief valve 79 couples the second node 70 to the tank return line 34 to relieve any dangerously high pressure occurring in the cylinder chambers 21 or 22.

Figure 3:
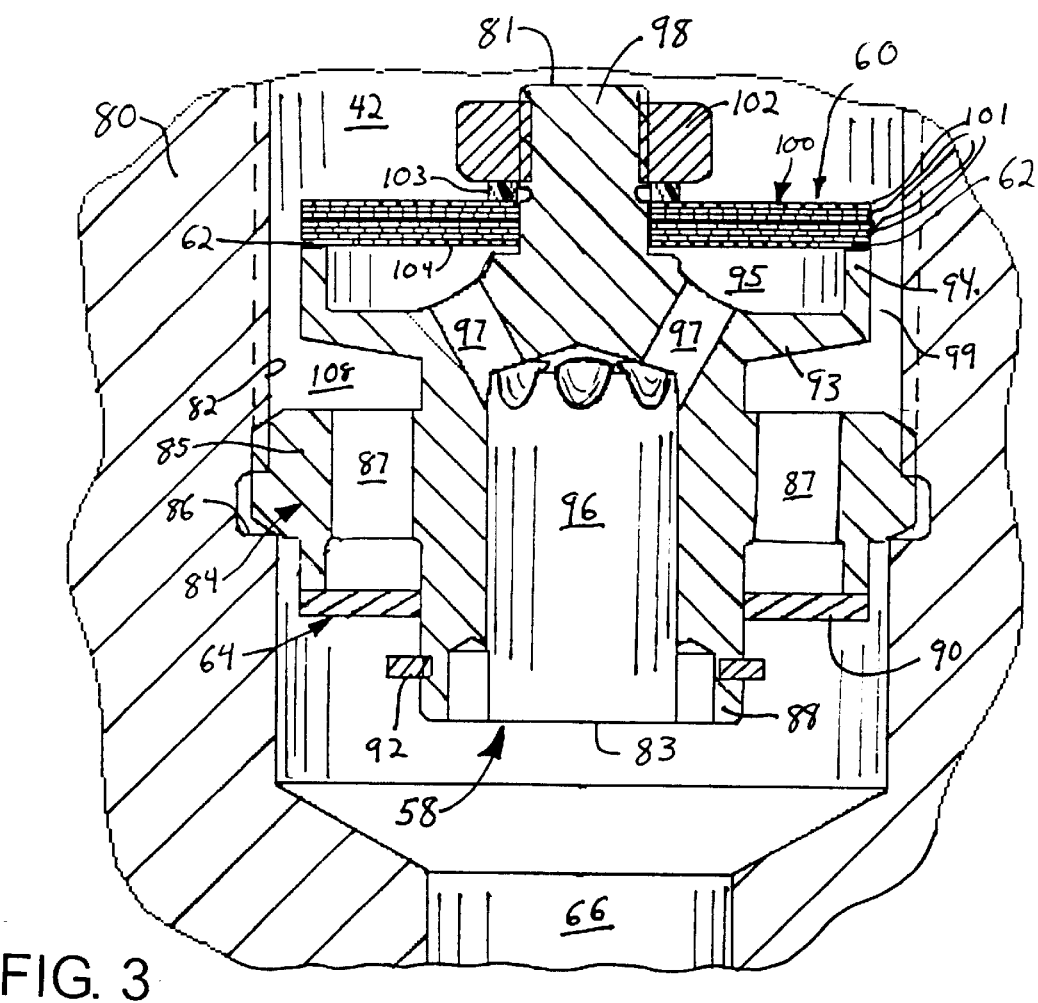
FIG. 3 is a cross sectional view through a valve assembly employed in the present hydraulic circuit.

Although separate elements can be utilized for each of the first and second valve subcircuits 58 and 72, the three elements of each subcircuit can be efficiently integrated into a single assembly shown in FIG. 3. To simplify the description, this assembly will be explained with respect to the first subcircuit 58 which controls the flow of hydraulic fluid between first and second nodes 42 and 70. However it should be understood that the second valve subcircuit 72 has an identical structure.

The first valve subcircuit 58 is mounted within a bore 82 in valve housing 80 where the circular bore extends between the two nodes 42 and 70. The valve subcircuit 58 comprises a body 84 with first and second ends 81 and 83 with an intermediate section there between. The intermediate section has a circular first flange 85 with a threaded outer circumferential surface that enables the body 84 to be threaded into the bore 82 until securely engaging a shoulder 86. A plurality of apertures 87 extend through the periphery of the first flange 85 so that fluid is able to flow between the first and intermediate nodes 42 and 66, as will be described.

The body 84 has a first cylindrical section 88 that projects from the first flange 85 toward the intermediate node 66 and defines the second end 83. The first check valve 64 of subcircuit 58 is formed by an annular member, or disk, 90 that has a central aperture through which the first cylindrical section 88 extends. A slip ring 92 retains the check valve disk 90 on to the first cylindrical section 88 while allowing the disk to slide longitudinally along the cylindrical section to control.

A second flange 93 extends outwardly from the body 84 between the first flange 85 and the first end 81. The second flange 93 has an annular lip 94 extending therefrom toward the first end 81 thereby forming a cavity, or recess, 95 on one side of the second circular projection 93 and opening toward the first node 42. The second flange 93 and lip 94 have outer diameters that are less that the diameter of the bore 82 which creates a passage 99 around those elements. A central aperture 96 extends into the body from the second end 83 thereby opening into the intermediate node 66. A plurality of angled passages 97 extend between the central aperture 96 and the recess cavity 95. The central aperture 96 and angled passages 97 for passage by which pressure at the second node is communicated to that cavity 95.

Figure 4:
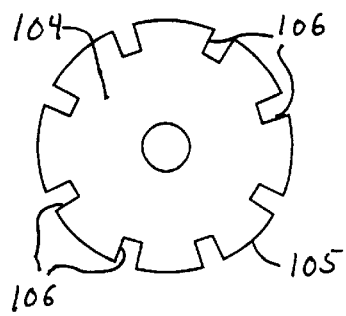
FIG. 4 illustrates a disk used in the valve assembly of FIG. 3.

The first end 81 of the body 84 has a second cylindrical section 98 projecting coaxial from the second flange 93 toward the first node 42. A disk pack 100 comprises a plurality of annular disks 101 that are mounted on the second cylindrical section 98 and held in place by a washer 103 and nut 102 which is threaded onto the end of the second projection. By tightening the nut 102 to a defined torque (e.g. 6.8 Nm), the disks are forced against the edges of the flanges 94 and act as a spring having a bias force determined by the torque on the nut 102. The innermost disk 104 that abuts the edge of the flange 94 has a serrated edge 105 with notches 106 shown in FIG. 4, which collectively form the orifice 62 along that edge as seen in FIG. 3.

With reference to FIGS. 2 and 3, the subcircuit's first check valve 64 is formed by the disk-shaped member 90 and the surfaces of the body 84. Specifically, fluid is able to flow from the first node 42 through passage 99 around the second flange 93 into a chamber 108 and then into the apertures 87 in the first flange 85 where the fluid abuts the disk-shaped member 90. If the pressure in at the first node 42 is greater than the pressure at the intermediate node 66, the fluid pushes the disk-shaped member 90 along the first cylindrical section 88 and away from the first flange 85. That action opens a passageway between the disk-shaped member and the body 85 so that fluid can flow to the intermediate node 66. Conversely, when the pressure at the intermediate node 66 is greater than the pressure at the first node 42, the fluid pushes disk-shaped member 90 against the first flange 85, thereby closing the passageway and preventing the fluid flow to the first node.

The orifice 62 of the subcircuit is formed by the plurality of notches 106 in the inner disk 104 which allow fluid to flow in either direction between the first and intermediate nodes 42 and 66. Specifically, the fluid flowing through the orifice from the first node 42 goes through chamber 95, angled passages 97 and aperture 96 in the body 84 to the intermediate node 66 and is able to flow in the opposite direction through those passages.

The first relief valve 60 is formed by the disk pack 100. The pressure at the first node 42 acts on one side of the disk pack 100 while pressure at the intermediate node 66 is communicated via aperture 96 and angled passages 97 into the cavity 95 where it acts on the other side of the disk pack. When the pressure at the first node 42 is greater than pressure at the intermediate node 66, the plurality of disks 101 in the disk pack 100 are pressed against the flange 94, thereby restricting fluid flow to that which occurs through the orifice notches 62. However, when pressure at the intermediate node 66 is greater than that at the first node 42 by an amount that exceeds the force applied by nut 102, the edges of the disks are pushed away from the lip 94. This action opens a larger area fluid passage between the cavity 95 and the first node 42.

Referring again to the operation of the hydraulic circuit shown in FIG. 2, when the load on the tractor 10 increases significantly causing its body to drop with respect to the axle, the piston 20 moves upward in the cylinder 18. In order to raise the body of the tractor, additional pressurized hydraulic fluid has to be added to the piston chamber 22 of the cylinder. This is accomplished by the controller 52 opening the first solenoid operated control valve 36 so that the hydraulic fluid in the pump supply line 32 flows through the supply check valve 40 to the first node 42. From the first node 42 the fluid continues through the first check valve 64 in the first subcircuit 58 and an opened lock-out valve 68 to the piston chambers 21 and 22. In response, the tractor body 12 rises because the area of the piston exposed in the upper cylinder chamber 22 is greater than the piston area in the lower chamber 21 due to the area occupied by the rod 24. As a consequence, the greater pressure in the upper chamber 22 will exert a greater force on the piston 20 forcing it downward.

A sensor (not shown) on the truck undercarriage indicates when the tractor body 12 has raised to the proper distance from the axle 14. At that time, controller 52 de-energizes the first control valve 36 to disconnect the hydraulic circuit 30 from the pump supply line 32. Pressure at the outlet 37 of the first control valve is relieved through the valve to the tank return line 34 so that the pressure does not affect the load sense line 38 when the first control valve is de-energized. The supply check valve 40 prevents the fluid that has been applied to the cylinder 18 from flowing backward through this connection to the tank return line 34.

Similarly, when a heavy load is removed from the tractor 10, the relatively high pressure in piston chamber 22 tends to force the piston 22 downward, raising the tractor body away from the axle 14. The automatic load leveling system senses this movement and the controller 52 responds by opening the second control valve 50 while maintaining the lock-out valve 68 in the open position. This solenoid operated second control valve 50 acts as a pilot valve controlling the operation of the pilot operated valve 46. Specifically, opening the second control valve 50 applies pressurized fluid from the pump supply line 32 through the control passage 48 to the pilot chamber of valve 46 causing the latter valve to open. This relieves pressure in the cylinder 18 by allowing the fluid therein to drain to the system tank through the tank return line 34 until the tractor body 12 is at the proper height above the axle 14. Specifically, fluid from the piston chamber 22 flows through the open lock-out valve 68 to the first subcircuit 58 causing the first relief valve 60 to open. Because of the orifice formed by the notches 106 in disk 104 the pressure on both sides of the disk pack 100 usually is equal. Thus the relief valve opens when that pressure exceeds the force exerted by the nut 102. The fluid continues to flow through the first node 42 and orifice 44 to the pilot operated valve 46 and into the tank return line 34.

Some of the fluid from the piston chamber 21 flows through the second node 70 and the second check valve 78 of the second subcircuit 72 into the expanding rod chamber 21. Thus, the rod chamber 21 does not require fluid from the pump supply line 32 during this phase of load leveling. As a consequence, the present hydraulic circuit 30 enables the body 12 to be lowered by employing its own weight and without the use of pressurized fluid from the pump supply line 32.

When the tractor body 11 lowers to the proper height, the controller 52 closes the second control valve 50. At that point the pressure within the control passage 42 bleeds to the tank return line 34 through orifice 54 resulting in closure of the pilot operated valve 46.

When load leveling is not active, the present hydraulic circuit 30 acts as a shock absorber, as long as the controller 52 maintains the lock-out valve 68 in the open position, i.e. opposite to that illustrated in FIG. 2. As the vehicle encounters rough terrain, the front wheels 16 move up and down with respect to the body 12. When the vehicle encounters a bump, the axle 14 pushes the rod 24 and piston 20 upward in the cylinder 18 forcing fluid to flow from the upper piston chamber 22 through the second node 70 and the second valve subcircuit 72 into the rod chamber 21. The movement of the piston 20 is dampened by restriction of that fluid flow due to the size of the tubing interconnecting the cylinder chambers 21 and 22. It also will be appreciated that the volume of the rod chamber 21 is less than that of the piston chamber 22 because of the rod 24. The excess fluid flows through the open lock-out valve 68 and the first orifice 62 of first subcircuit 58 into the accumulator 56. If the bump is sever, a relatively high pressure created in the piston chamber 22 may cause the relief valve 60 in the first subcircuit 58 to open, thus aiding the transfer of fluid into the accumulator 56. This fluid is stored under pressure in the accumulator. Note that the supply check valve 40 and the closed pilot operated valve 46 prevent the flow of this hydraulic fluid further backward through the circuit 30.

Thereafter, when the body 12 of the vehicle 10 tends to rise away from the axle 14, the rod 24 connected to the axle pulls the piston 20 downward within the cylinder 18 in the orientation shown in FIG. 2. This motion of the piston 20 forces fluid from the rod chamber 21 back through the hydraulic circuit to the piston chamber 22. Specifically, the fluid will flow from the rod chamber 21 through the second orifice 76 of the second subcircuit 72, then through the second node 70, and into the piston chamber 22.

Should pressure in the rod chamber 21 be significantly greater than that in the piston chamber 22, the second relief valve 74 in second subcircuit 72 will open providing a bypass path for the fluid to flow around the second orifice 76 and rapidly into the piston chamber 22. When the pressure differential decreases the second relief valve 74 closes, so that second orifice 76 restricts the flow of fluid between the two chambers 21 and 22.

Because the piston chamber 22 is larger than the rod chamber 21, the fluid previously stored under pressure in the accumulator 56 is drawn through the first node 42 and the first check valve 64 of the first subcircuit 58, then through the fully opened lock-out valve 68 and into the piston chamber 22. The fluid from the accumulator makes up for the difference in volume between the two chambers 21 and 22.

Under some operating conditions, it is desirable that off-road equipment have a very stiff suspension which is achieved by disabling, or locking-out, the shock absorption function of the present hydraulic circuit 30. In this case, the controller 52 de-energizes the lock-out valve 68 placing it in the position illustrated in FIG. 2 in which a relatively small orifice connects the intermediate and second nodes 66 and 70 of the hydraulic circuit 30. This restricts the flow of excess fluid from the piston chamber 22 of cylinder 18 to the rod chamber 21 because of the size differential of those two chambers. That is, as the piston 20 moves upward, a greater amount of fluid has to be pushed out of the piston chamber 22 than can be accommodated by the expansion of the rod chamber 21. Thus when the lock-out valve 68 is closed, movement of the piston is restricted, because the excess fluid cannot freely flow into the accumulator 56 due to the relatively small orifice of the closed lock-out valve. An alternative embodiment of the lock-out valve 68 eliminates that orifice so that the connection between nodes 66 and 70 is closed completely in the valve's de-energized state. Both embodiments provide a very stiff acting suspension for the vehicle 10 when the lock-out valve 68 is de-energized.

Figure 5:
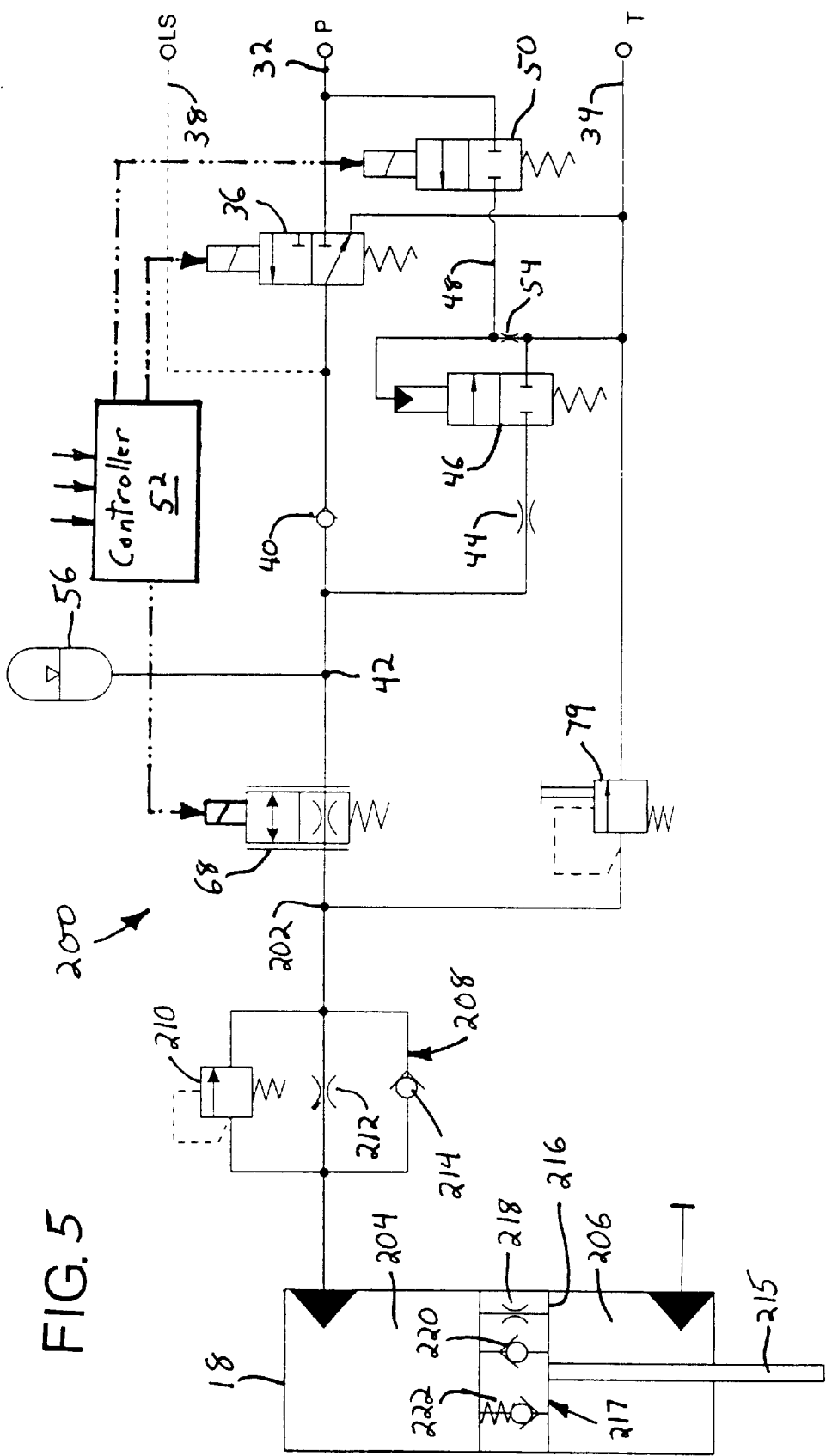
FIG. 5 is a schematic diagram of an alternative hydraulic circuit for the regenerative suspension system.

FIG. 5 illustrates an alternative embodiment of a regenerative hydraulic circuit 200 that performs these functions in which the second subcircuit is incorporated into the cylinder piston. The components of the alternative hydraulic circuit 200 that correspond each components of the first circuit 30 in FIG. 2 have identical reference numerals. Specifically, the components between the first node 42 and the pump supply line 32 and the tank return line 34 are the same as in the previous embodiment. Similarly, an accumulator 56 is connected to the first node 42 which in turn is coupled to a second node 202 by the lock-out valve 68. A pressure relief valve 79 connects the second node 202 to the tank return line 34.

The second node 202 in the alternative hydraulic circuit 200 is connected to the piston chamber 204 of the cylinder 18 by a subcircuit 208. The rod chamber 206 of the cylinder 18 is not connected directly to any external components. The subcircuit 208 comprises a pressure relief valve 210, an orifice 212 and a check valve 214. The relief valve 210 opens when the pressure in the piston chamber 204 is a predetermined amount greater than the pressure at the second node 202. The orifice 212 connects the piston chamber 204 to the second node 202 and the check valve 214 permits fluid to flow there through only from the second node 202 to the piston chamber 204.

The piston 216 in cylinder 18 has a rod 215 connected to it and incorporates the structure of the second subcircuit 217.

Specifically, piston 216 has an orifice 218 extending there through between the piston and rod chambers 204 and 206. An internal check valve 220, within the piston, allows the free flow of fluid only in a direction from the piston chamber 204 to the rod chamber 206. Flow in the opposite direction from the rod chamber 206 into the piston chamber 204 is permitted by a pressure relief valve 222 when the pressure in the rod chamber is a predetermined amount greater than that in the piston chamber. Thus, elements 218, 220, and 222 correspond respectively to components 76, 78 and 74 in the circuit embodiment in FIG. 2.

The alternative hydraulic circuit 200 functions in the same manner as that described previously with respect to the first hydraulic circuit 30. However, this circuit has the advantage of fewer connections to other components.

What is claimed is:

1. A hydraulic circuit for controlling a suspension of a vehicle having a cylinder with a piston that defines a piston chamber and a rod chamber within the cylinder, said hydraulic circuit comprising:

a first node;

a second node connected to the piston chamber;

a first control valve having an inlet for connection to a pump supply line of the vehicle and having an outlet coupled to the first node;

a control valve assembly connecting the first node to a tank return line of the vehicle;

an accumulator coupled to the first node;

a first check valve coupling the first node to the second node, wherein fluid can flow through the first check valve only in a direction from the first node to the second node;

a first orifice connected in parallel with the first check valve;

a second check valve coupling the piston chamber to the rod chamber, wherein fluid can flow through the second check valve only in a direction from the piston chamber to the rod chamber; and a second orifice connected in parallel with the second check valve.

2. The hydraulic circuit as recited in claim 1 wherein the control valve assembly comprises:

a second control valve having an inlet for connection to the pump supply line and having a outlet; and a pilot operated valve having a first port coupled to the first node, a second port for connection to the tank return line, and a control port connected to the outlet of the second control valve, wherein the pilot operated valve is of a type in which communication between the first port and the second port is controlled by pressure applied to a control port.

3. The hydraulic circuit as recited in claim 2 wherein the control valve assembly further comprises a relief orifice connecting the control port to the second port of the pilot operated valve.

4. The hydraulic circuit as recited in claim 2 wherein the control valve assembly further comprises a drain orifice connecting the first port of the pilot operated valve to the first node.

5. The hydraulic circuit as recited in claim 1 further comprising a relief valve connected in parallel with the first check valve, and opening when pressure at the second node exceeds a predefined pressure level.

6. The hydraulic circuit as recited in claim 1 further comprising a relief valve connected in parallel with the second check valve, and opening when pressure in the rod chamber exceeds a predefined pressure threshold.

7. The hydraulic circuit as recited in claim 1 further comprising a third check valve coupling the outlet of the first control valve to the first node, and preventing fluid from flowing from the first node to the first control valve.

8. The hydraulic circuit as recited in claim 1 further comprising a lock-out valve connected between the first node and the second node and in series with first check valve and the first orifice to isolate the cylinder from the accumulator.

9. An apparatus for controlling a suspension of a vehicle having a cylinder with a piston that defines a piston chamber and a rod chamber within the cylinder, said apparatus comprising:
   a first node;
   a second node connected to the piston chamber;
   a first solenoid control valve having an inlet for connection to a pump supply line of the vehicle and having a outlet coupled to the first node;
   a control valve assembly connecting the first node to a tank return line of the vehicle permitting fluid to flow from the first node back to tank, and being operated by a control signal;
   an accumulator coupled to the first node; and
   a lock-out valve connected between the first node and the second node to isolate the cylinder from the accumulator.

10. The apparatus as recited in claim 9 further comprising a controller connected to and electrically controlling the first solenoid control valve, the control valve assembly, and the lock-out valve.

11. The apparatus as recited in claim 9 further comprising:
   a first subcircuit including a first check valve coupling the first node to the piston chamber, wherein fluid can flow through the first check valve only in a direction from the first node to the piston chamber, and including a first orifice connected in parallel with the first check valve; and
   a second subcircuit integrated into the piston and including a second check valve coupling the piston chamber to the rod chamber, wherein fluid can flow through the second check valve only in a direction from the piston chamber to the rod chamber, and including a second orifice connected in parallel with the second check valve.

12. The apparatus as recited in claim 9 further comprising:
   a first subcircuit including a first check valve coupling the first node to the second node, wherein fluid can flow through the first check valve only in a direction from the first node to the second node, and including a first orifice connected in parallel with the first check valve; and
   a second subcircuit including a second check valve coupling the second node to a port of the rod chamber, wherein fluid can flow through the second check valve only in a direction from the second node to the rod chamber, and including a second orifice connected in parallel with the second check valve.

13. The apparatus as recited in claim 9 further comprising:
   a first subcircuit including a first check valve coupling the first node to the second node wherein fluid can flow through the first check valve only in a direction from the first node to the second node, a first orifice connected in parallel with the first check valve, and a relief valve connected in parallel with the first check valve and opening when pressure at the second node exceeds a predefined pressure level; and
   a second subcircuit including a second check valve coupling the second node to the rod chamber wherein fluid can flow through the second check valve only in a direction from the second node to the rod chamber, a second orifice connected in parallel with the second check valve, and a relief valve connected in parallel with the second check valve and opening when pressure in the rod chamber is greater than a predefined pressure level.

14. The apparatus as recited in claim 10 further comprising a third check valve coupling the outlet of the first control valve to the first node and permitting fluid to flow only in a direction from the first control valve to the first node.

15. The aparatus as recited in claim 9 wherein the control valve assembly comprises:
   a second control valve having a inlet for connection to the pump supply line and having a outlet;
   a pilot operated valve having a control port connected to the outlet of the second control valve, having a first port coupled to the first node, and having a second port for connection to the tank return line.

16. The apparatus as recited in claim 15 wherein the control valve assembly further comprises a relief orifice connecting the control port to the second port of the pilot operated valve.

17. The apparatus as recited in claim 15 wherein the control valve assembly further comprises a drain orifice connecting the first port of the pilot operated valve to the first node.

18. A hydraulic circuit for controlling a suspension of a vehicle having a cylinder and piston, wherein the piston defines a piston chamber and a rod chamber within the cylinder, said hydraulic circuit comprising:
   a first node;
   an accumulator coupled to the first node;
   a second node connected to a port of the piston chamber;
   a first control valve having a inlet for connection to a pump supply line of the vehicle and having a outlet;
   a supply check valve coupling the outlet of the first control valve to the first node and permitting fluid to flow only in a direction from the first control valve to the first node;
   a control valve assembly connecting the first node to a tank return line of the vehicle;
   a first check valve coupling the first node to the second node, wherein fluid can flow through the first check valve only in a direction from the first node to the second node;
   a first orifice connected in parallel with the first check valve;
   a first relief valve connected in parallel with the first check valve, and opening when pressure at the second node exceeds a predefined pressure level;
   a second check valve coupling the piston chamber to the rod chamber, wherein fluid can flow through the second check valve only in a direction from the piston chamber to the rod chamber;

a second orifice connected in parallel with the second check valve; and a second relief valve connected in parallel with the second check valve, and opening when pressure in the rod chamber exceeds a predefined pressure level.

19. The hydraulic circuit as recited in claim 18 wherein the control valve assembly comprises:

a second control valve having a inlet for connection to the pump supply line and having a outlet;

a pilot operated valve having a control port connected to the outlet of the second control valve, having a first port coupled to the first node, and having a second port for connection to the tank return line.

20. The hydraulic circuit as recited in claim 19 wherein the control valve assembly further comprises a relief orifice connecting the control port to the second port of the pilot operated valve; and a drain orifice connecting the first port of the pilot operated valve to the first node.

* * * * *

UNITED STATES PATENT AND TRADEMARK OFFICE
CERTIFICATE OF CORRECTION

PATENT NO. : 6,394,238 B1  
DATED : May 28, 2002  
INVENTOR(S) : Jeffrey A. Rogala It is certified that error appears in the above-identified patent and that said Letters Patent is hereby corrected as shown below:

<u>Column 10,</u>  
Line 16, change "10" to -- 9 --.  
Line 20, change "aparatus" to -- apparatus --.

Signed and Sealed this

Tenth Day of September, 2002

*Attest:*

*Attesting Officer*

JAMES E. ROGAN  
*Director of the United States Patent and Trademark Office*